United States Patent [19]

Friedrich et al.

[11] Patent Number: 4,647,230
[45] Date of Patent: Mar. 3, 1987

[54] ARANGEMENT FOR FASTENING A ROLLING BEARING IN A HOUSING

[75] Inventors: Wolfgang Friedrich, Schweinfurt; Heinz Kiener, Waigolshausen; K. A. Lücking, Niederwerrn; Josef Stork, Gerolzhofen, all of Fed. Rep. of Germany

[73] Assignee: SKF GmbH, Schweinfurt, Fed. Rep. of Germany

[21] Appl. No.: 742,726

[22] Filed: Jun. 7, 1985

[30] Foreign Application Priority Data

Jun. 7, 1984 [DE] Fed. Rep. of Germany ....... 3421188

[51] Int. Cl.⁴ .............................................. F16C 35/06
[52] U.S. Cl. ..................................... 384/510; 384/486; 384/504; 384/539; 384/903; 403/12; 411/517
[58] Field of Search ............................... 29/159.3, 453; 308/DIG. 11; 384/477, 482, 486, 490, 504, 510, 537, 539, 544, 548, 559, 561, 571, 584, 585, 903, 489, 617; 403/12; 411/353, 517, 518, 519

[56] References Cited

U.S. PATENT DOCUMENTS

| 3,890,020 | 6/1975 | Thomas | 384/559 |
| 4,106,827 | 8/1978 | Ducret et al. | 384/537 X |
| 4,289,414 | 9/1981 | Recker | 403/12 |
| 4,408,809 | 10/1983 | Walter et al. | 384/486 |
| 4,522,515 | 6/1985 | Miki et al. | 384/539 X |

FOREIGN PATENT DOCUMENTS

| 1438860 | 4/1966 | France | 411/517 |
| 1519656 | 8/1978 | United Kingdom . | |

Primary Examiner—Stanley N. Gilreath
Assistant Examiner—Daniel P. Stodola
Attorney, Agent, or Firm—Rosen, Dainow & Jacobs

[57] ABSTRACT

A spring ring is arranged in an annular gap of a pair of outer bearing rings in an arrangement for fastening a rolling bearing in the bore of a housing. A groove is provided in the housing for receiving the spring ring. A holding ring is mounted on the outer surface of the bearing outer ring, the holding ring having a collar aligned to hold the spring ring within the annular gap during the disassembled condition of the bearing. The holding ring has an axial surface adapted to engage the end of the housing during assembly, to enable the holding ring to be forced axially along the outer surface of the bearing outer ring. The holding ring futher has an end away from the spring ring adapted to form a seal with the bearing inner ring.

12 Claims, 9 Drawing Figures

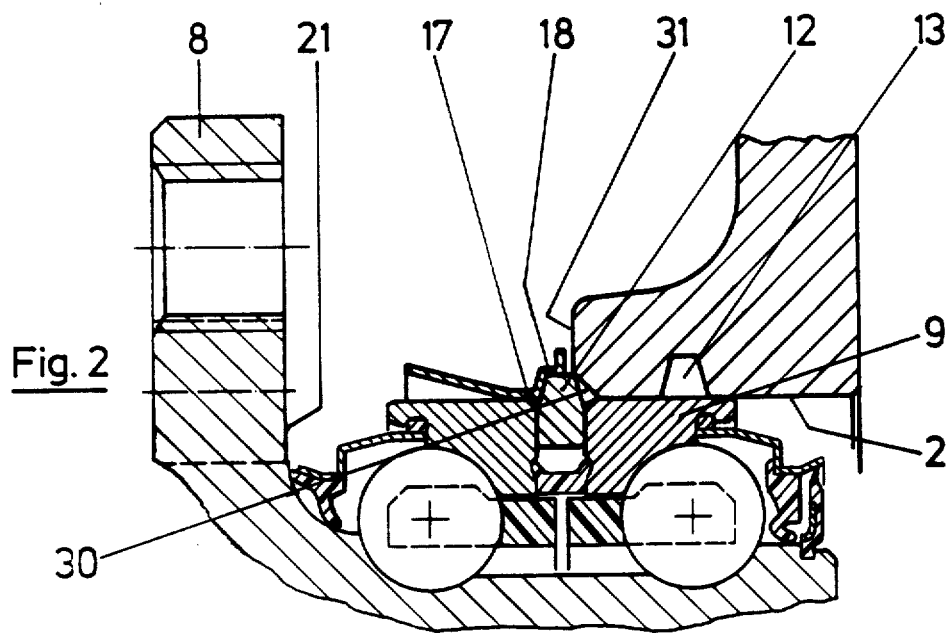
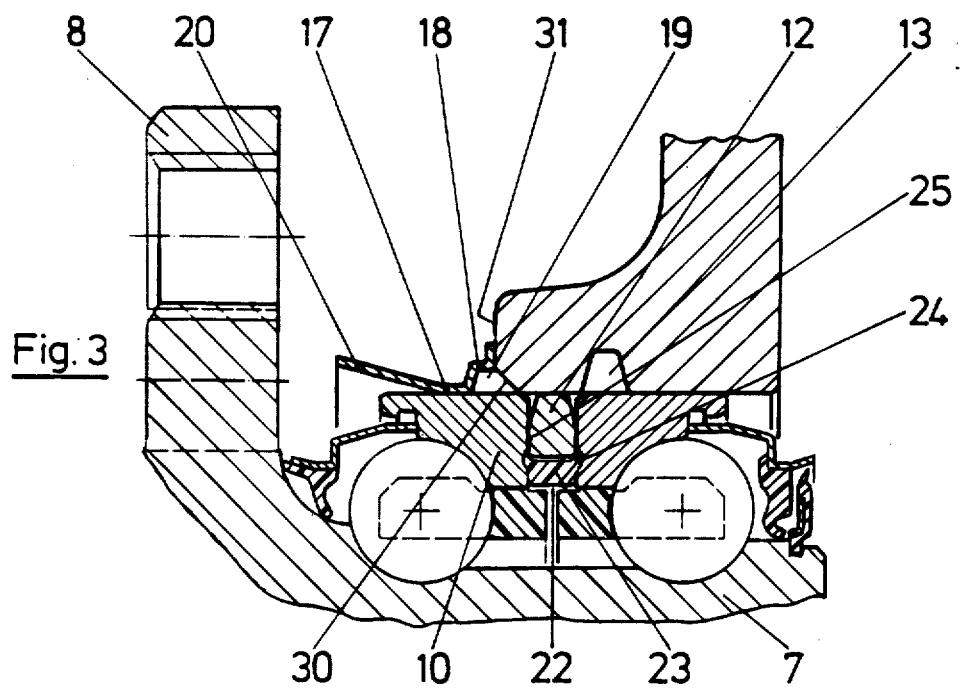

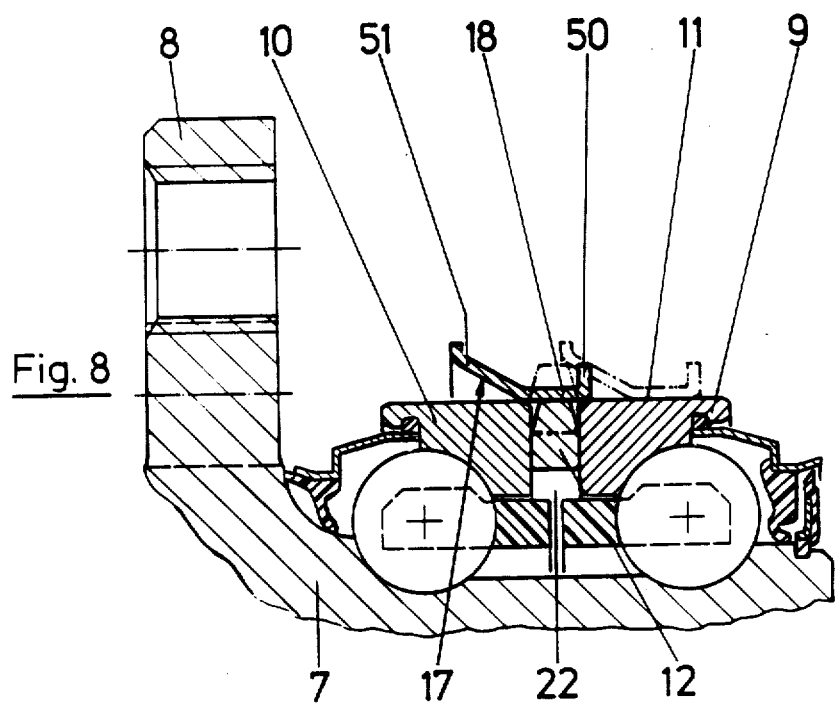
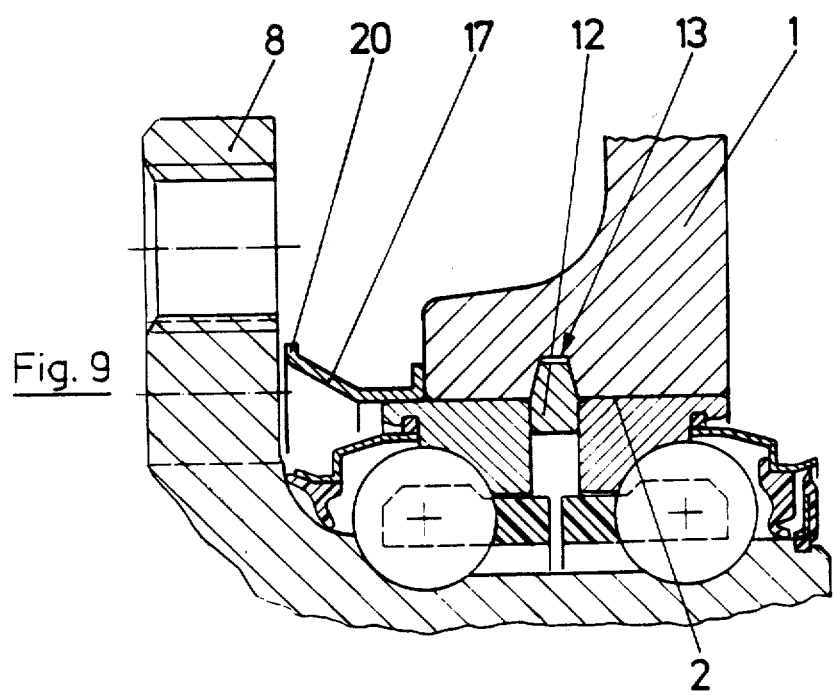

ARANGEMENT FOR FASTENING A ROLLING BEARING IN A HOUSING

This invention relates to an arrangement for fastening a rolling bearing in a housing or the like.

A fastening arrangement of the above type is disclosed in U.S. Pat. No. 1,519,656, in which two bearing outer rings and the respective spring ring are inserted separately in the bore of a housing, and then are fastened in the housing by the axial installation of two bearing inner rings. This known arrangement is structurally as well as assemblywise quite complicated, since a central screwbolt must be axially guided through the two inner rings from outwardly to inwardly, so that the inner rings can be positioned opposite to one another on a movable flange.

The rolling bearing fastening arrangement in accordance with the invention renders it possible to assemble the various parts of a rolling bearing before their insertion in a bearing arrangement This assembly advantageously is effected during production. During the fastening of the rolling bearing in the housing it is axially pressed into the bore of the housing. As a consequence, the holding ring on the outer surface of the outer bearing ring is axially displaced so that the spring ring is free to snap in the annular groove of the housing. The pressing of the rolling bearing in the bore of the housing can be effected with a press of an automatic assembly arrangement, whose stamp laterally engages the bearing inner ring or the bearing outer ring. As a result, no further fastening elements for the axial fixing of the rolling bearing in the housing are necessary.

In accordance with a further feature of the invention, and during the insertion and sliding of the rolling bearing, not only is the holding ring of the boring of the housing axially outwardly pushed to the outer surface of the outer bearing ring, but also the spring ring with its annular section is radially inwardly pressed in the annular gap of the bearing outer ring.

Still further in accordance with the invention, the holding ring has a seal which acts together with a sealing surface of the bearing inner ring, at least after the insertion of the rolling bearing in the corresponding axial pushing of the holding ring.

Still further in accordance with the invention, the holding ring engages the spring ring with its conical bore section from radially outwardly and presses the spring ring in the annular gap of the bearing outer ring at least in part in the assembly of the bearing outer ring. In the final steps of assembly of the rolling bearing in the housing, the holding ring is engaged on the end thereof opposite the bore section and pushed from the spring ring, so that the spring ring can automatically snap into the annular groove of the housing.

In a still further feature of the invention the advantage is achieved that the spring ring produces a play free connection between the housing and the bearing outer ring after it snaps in the annular groove of the housing. In a still further feature of the invention the snapping of the spring ring in the annular groove of the housing is facilitated since the opposed contacting face and side surfaces of the spring ring and the bearing outer ring respectively oppose the radial snapping movement of the spring ring with only a relatively small friction.

In accordance with a still further feature of the invention an especially simplified fastening arrangement for the bearing ring in the housing is provided, by an arrangement wherein the annular gap for the reception of the spring ring is formed by a circulating groove in the side wall of the bearing outer ring. This groove can, for example, be ground during the formation of the bearing outer ring.

In accordance with another feature of the invention, a rolling bearing with a transversely split outer ring is provided for mounting together with the spring ring to provide the unitary assembly. In the assembly of this rolling bearing as a unit the bearing outer ring surrounding the rolling bodies of the respective rolling body row, which are in turn set on the bearing inner ring, can be shoved in the bore of the housing.

In accordance with a still further feature of the invention a disassembly of the rolling bearing from the bore of the housing can be effected by the provision of means enabling the spring ring to be pressed radially inward.

In order that the invention may be more clearly understood it will now be disclosed in greater detail with reference to the accompanying drawings, wherein:

FIG. 2 is a partial cross-section of the bearing arrangement of FIG. 1 in which the bearing is partially pushed into the housing up to the point of contact between the edge of the annular section of the spring ring and a chamfered edge of the housing;

FIG. 3 is a partial cross-sectional view of the bearing arrangement of FIG. 1 in which the bearing has been pushed further into the housing than in the arrangement of FIG. 2.

FIG. 8 is a partially longitudinal cross section through a rolling bearing assembly before its mounting in a housing;

FIG. 9 is a partial longitudinal cross section in accordance with FIG. 8 wherein the rolling bearing is fully inserted in the housing.

Figure 1:
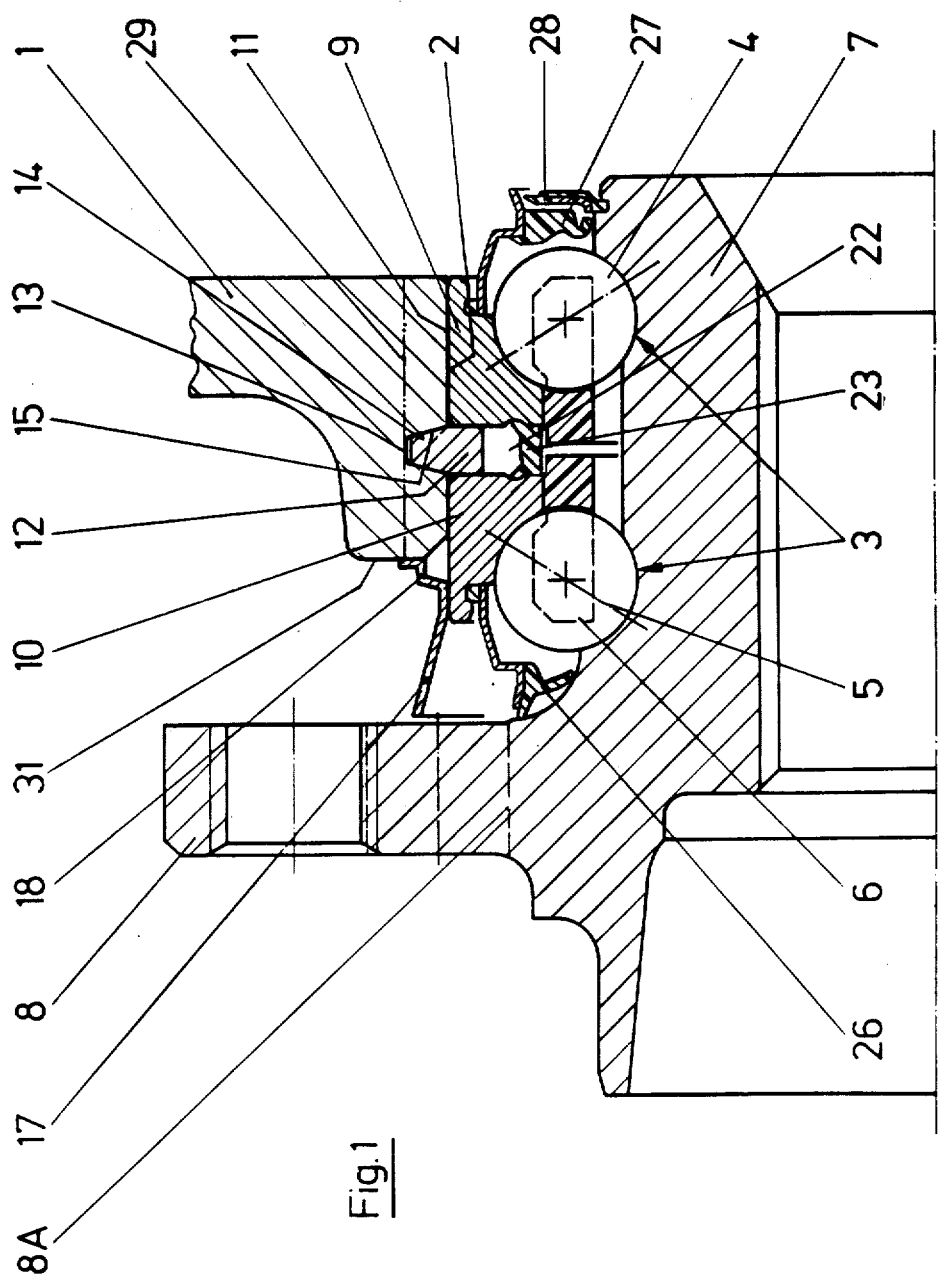
FIG. 1 is a partial cross-sectional view of a mounting arrangement for a rolling bearing in a housing in accordance with one embodiment of the invention.

Referring now to the drawings, FIG. 1 illustrates a housing adapted to be affixed to the frame (not illustrated) of the vehicle (not shown). In this arrangement a rolling bearing is radially and axially affixed in the bore 2 of the housing 1.

In the illustrated example, the rolling bearing has two rolling body rows of spherical rolling bodies 4. The force action lines 5 of the two rolling body rows extend in an O-arrangement to one another. The rolling bodies 4 of each rolling body row 3 are held at a determined circumferential distance from one another by a plastic cage 6, into which the rolling bodies 4 are axially snapped. The rolling bodies 4 of each rolling body row 3 run in separate race grooves of a common bearing inner ring 7. An outwardly directed mounting flange 8, forming a part of the bearing inner ring, extends from the left side of the inner bearing ring 7 as illustrated in FIG. 1. A wheel and its brake elements (not shown) are adapted to be affixed to the mounting flange 8 in conventional manner. Drive elements (not shown) for the wheel are installed inside of the inner bearing ring 7 and are connected to the bearing inner ring 7.

The rolling bearing has a transversely separated bearing outer ring with a part 9 and a part 10. The two parts 9, 10 are provided with races for separate ball bearing rows 3. They have a cylindrical outer surface 11 with the same diameters and are mounted coaxial with one another in the bore 2 of the housing 1. A slit spring ring 12 of spring steel is inserted in the space 22 between the parts 9 and 10. This spring ring 12 is inserted and set with its flat side surfaces between the bearing ring parts 9 and 10, so that the rolling bearing has a determined bearing play or a determined stress after its mounting in the housing.

Figure 5:
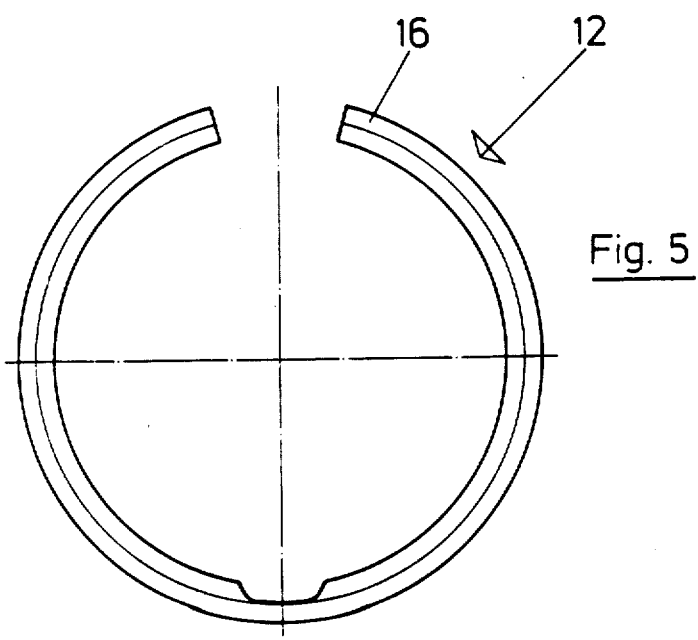
FIG. 5 is a view of a modified form of the spring ring of FIG. 4.

The spring ring 12, as illustrated in FIG. 5 springs in part in a groove 13 (FIG. 1) in the bore 2 of the housing 1, so that its outer ring section 14 is received in the groove 13. The groove 13 has conical groove walls 15, which engage corresponding conically-shaped stops 16 of the ring sections 14 in the mounted condition of the rolling bearing providing a tight form closed engagement therewith. (see FIG. 1). Not only the side surfaces but also the stopping surfaces 16 of the spring ring 12 are coated with a friction minimizing lubricant, for example, molybdenum disulphide.

A holding ring 17 is mounted on the outer surface 11 of the part 10, the holding ring 17 having a collar section 18 with a bore opening 19 opening toward the spring ring 12. The holding ring 12 has a sealing section 20 on the side thereof directed away from the spring ring, as illustrated in FIG. 2. This sealing section projects axially outwardly over the end of the part 10 in the mounted condition of the rolling bearing and forms a sealing gap with a sealing surface 21 of the mounting flange 8.

An elastic sealing ring 23 of rubber is inserted in the annular space 22, and is snapped with its two annular holding projections 24 received in grooves on the side surfaces 25 of the annular space 22. The annular seal 23 contacts the two parts 9 and 10 of the bearing outer rings with its two holding projections 24 and outwardly seals the bearing space of the rolling bearing thereby at this position.

Sliding annular sealing lips 26 and 27 are affixed to the bearing inner ring 7 at the outer ends of the parts 9 and 10 of the bearing outer ring, in known manner. In addition, a series seal 28 is inserted in a groove of the bearing inner ring 7 on the side of the bearing inner ring away from the mounting flange 8.

Three identical circumferentially distributed groove shaped openings are machined to extend axially through the bore 2 of the housing 1 (indicated by dash-dot lines in FIG. 1). These openings 29 define a radial intermediate space with the cylindrical outer surface of the spring ring 12. Suitable disassembly bolts (not shown) with inclined end surfaces can be axially inserted in each opening 29, so that the inclined end surfaces outwardly engage the spring ring 12 and force it radially inwardly, whereby the bearing assembly can be subsequently withdrawn from the bore 2 of the housing 1, i.e. leftwardly in the embodiment of FIG. 1.

In order to mount the rolling bearing, it is initially assembled on a prepared bearing arrangement with the holding ring 12 abutting the outer surface 11 of part 10, so that the spring ring 12 is surrounded by the bore opening 19 of the collar section 18, as illustrated in FIG. 2.

Upon mounting of the rolling bearing, the part 9 thereof is pushed forwardly in the bore 2 of the housing 1 until a radially outer edge of the ring section 14 of the spring ring forcefully contacts the substantially conical chamfered edge 30 of the housing 1, as illustrated in FIG. 2. Thereupon pressure stamps, which extend through the holes 8A in the mounting flange 8, engage the outer end surface of the part 10 and exert axial pressure. Upon further pressing of the rolling bearing in the bore 2, the ring section 14 of the spring ring is completely pressed in from the chamfered edge 30 into the annular gap 22, as illustrated in FIG. 3. At the same time the collar section 18 of the holding ring 17 abuts against the stopping surface on the opposed end surface 31 of housing 1.

Figure 4:
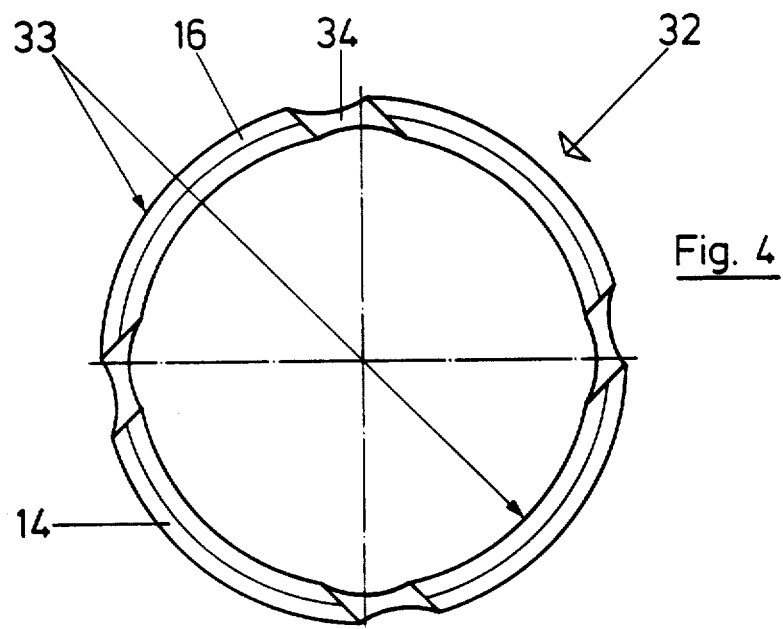
FIG. 4 is a side view of one embodiment of the spring ring for the mounting arrangement of FIGS. 1-3.

Following the shoving of the rolling bearing in the bore 2 the spring ring springs with its ring section 14 in the annular groove 13 of the bore 2, so that the rolling bearing is held in this bore 2 in both axial directions. Instead of the spring ring 12 illustrated in FIG. 5, the spring ring 32 illustrated in FIG. 4 can be employed for holding the bearing. This spring ring 32 has four identical long arcuate sections 33 of a hard material which are connected to one another by intermediate pieces 34 of elastically yielding plastic. The intermediate pieces 34 permit resulting characteristics of an elastic spring by the opposed displacement of the stiff arcuate segments 33, since the chamfered edge 30 of the bore 2 presses the outer edge of the annular section 14 of the spring rings 32 into the annular gap 22.

A modified fastening arrangement is illustrated in FIG. 6, in which again a two-row rolling bearing is inserted in the bore 2 of a housing 1. This rolling bearing has also a single part bearing inner ring 7 and a bearing outer ring formed of two parts 9 and 10. A spring ring 12 is positioned in the annular gap 22 which holds the parts 9 and 10 at a determined axial distance from one another in the bore 2 of the housing 1. In this modified fixing arrangement the sealing section of the holding ring 17' is formed of rubber and comprised of a sealing ring 35 connected to the holding ring 17' by a vulcanization process, the sealing ring 35 being slidably arranged on the sealing surface 21 of the bearing inner ring 7. The holding ring 17' has bending resilient tongues 36 on the end thereof toward the spring ring 17', the tongues 36 each having a radially inwardly projecting bulge 37. An outer holding groove 38 and inner holding grooves 39 arranged near thereto are machined in the outer surface of the part 10.

The bulges 37 are snapped in the inner holding grooves 39 in the initial holding position of the rolling bearing, so that the sealing ring 35 is held at a predetermined position on the part 10. The free ends of the tongues 36 thereby project into a slit groove 40 in the face 31 of the housing, so that they are held in the slit groove 40 and cannot spring radially outwardly in operation.

Before the mounting of the rolling bearing in the bore 2 the rolling bearing is assembled in a self-holding bearing arrangement. The holding ring 17' then sits on the outer surface of the part 10, so that the tongues 36 of the holding ring outwardly surround the spring ring 12. The bulges 37 of the spring fingers 36 are snapped in the inner holding groove 39. The sealing ring 35 is located in the bore of the part 10 and is outwardly supported there from damage. The inner sealing lip 41 of the sealing ring 35 contacts the rolling body 4 of the part 10 with light pretension.

An annular seal 42 of elastically yielding material is inserted between the two parts 9 and 10 of the bearing outer rings, and is located radially inwardly of the spring ring 12. These annular seals 42 are roof-shaped, extending outwardly, with outer inclined surfaces 43. Each of the inclined surfaces 43 contacts a chamfered inner edge of a respective one of the parts 9 and 10 and thereby outwardly seals the annular gap 22.

During the assembly of the rolling bearing 2 to a bearing arrangement, the two-parts 9, 10 of the bearing outer rings must be pressed axially against one another, so that the gap 22 is closed and the rolling body row 3 of the part 9 can be filled with the rolling bodies 4. The previously inserted elastic annular seal 42 is thereby temporarily radially inwardly on their inclined surfaces 30 by the two parts 9 and 10.

Four identical circumferentially distributed openings are machined in the housing 1, extending radially from the outer surface through to the inner surface, to the cylindrical outer surface 45 of the spring ring 12, 32. A threaded disassembling bolt 46 is screwed in each opening 44. The openings 44 are outwardly closed by a plastic material 47.

Figure 6:
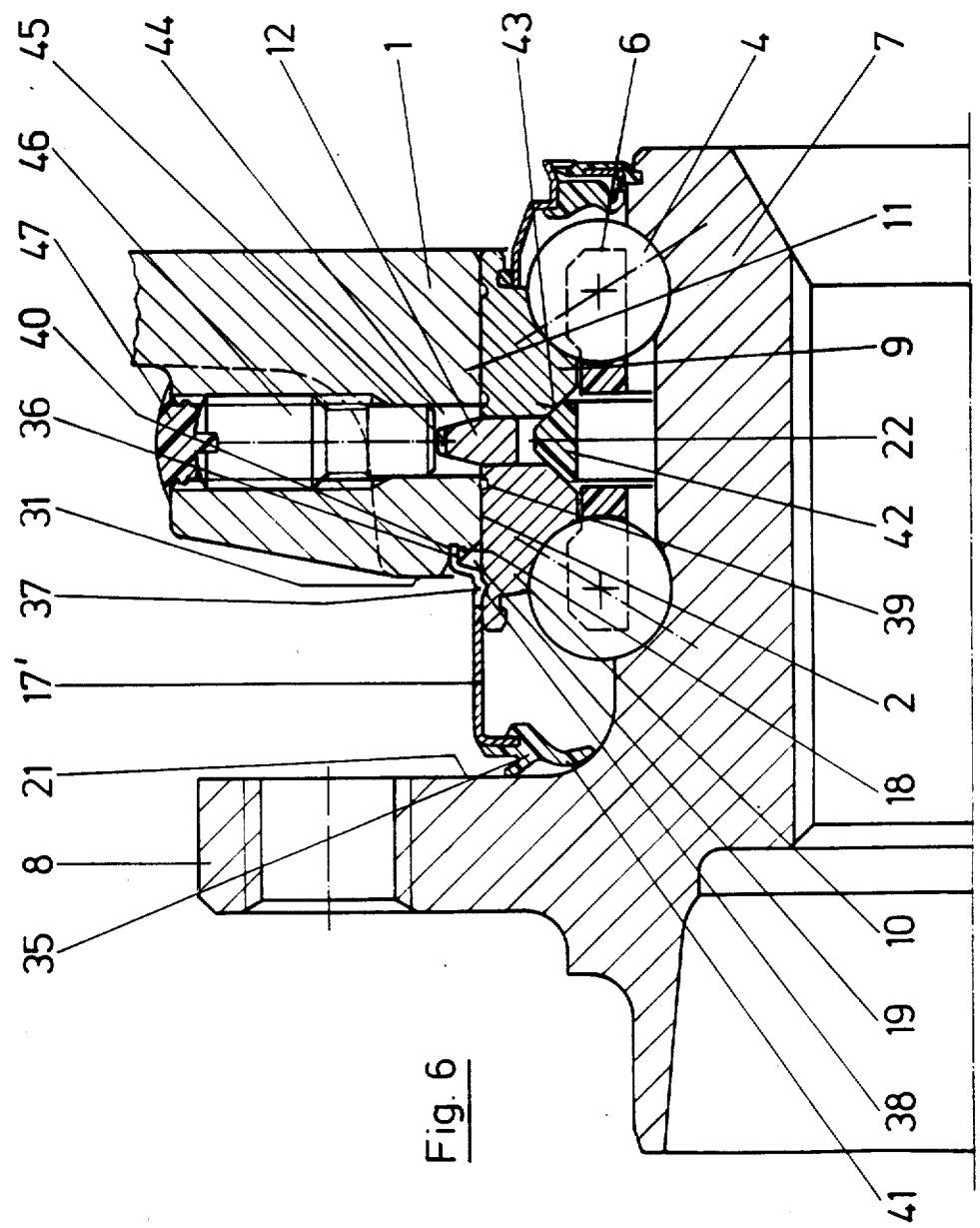
FIG. 6 is a partial cross-sectional view of a modified mounting arrangement.

During disassembly of the rolling bearing illustrated in FIG. 6, the plastic material 47 is first removed. Then each of the disassembly bolts 46 are engaged with a screwdriver and the disassembly bolts 46 are then radially inwardly turned until they are pressed against the outer surface 45 of the spring ring 12, 32 and the spring ring 12, 32 is forced by further screwing into the annular gap 22. As soon as the outer surface 46 is of the spring ring has a diameter which is precisely as large as the diameter of the outer surface 11 of the two parts 9 and 10, the screwing of the dismantling bolts 46 stopped. The mounting flange 8 can then be held and the complete bearing be withdrawn from the bore 2 of the housing 1, i.e. from the right toward the left in the illustration of FIG. 6.

Figure 7:
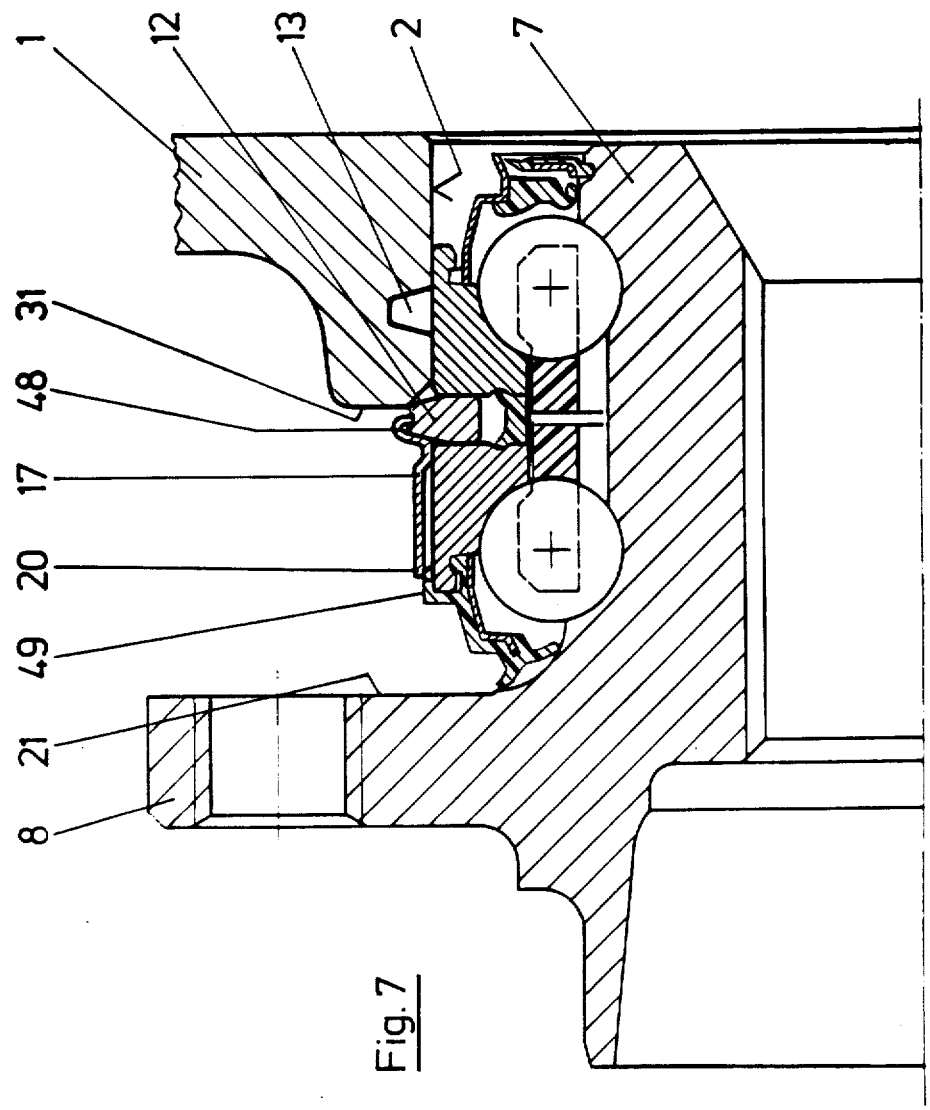
FIG. 7 is a partial cross-sectional view of a still further modified arrangement of the mounting of the bearing.

FIG. 7 illustrates a modified fastening arrangement in which a rolling bearing similar to the above-described rolling bearing is provided. The fastening arrangement has a holding ring 17 of steel sheet metal, whose bore opening 19 is formed with a U-shaped cross-section collar section. This collar section has a radially inwardly bent around stiff end 48, which engages an annular groove in the outer surface of the spring ring 12 when the rolling bearing has not yet been mounted. The rolling bearing is held together by the holding ring 17 to provide a bearing arrangement prepared for assembly.

Upon the mounting of the rolling bearing in the bore 2 of the housing 1, the spring ring 12 first engages the chamfered edge 30 of the housing and is thereby inwardly pressed so that the end 48 of the holding ring 17 comes out of the annular groove of the spring ring 12 and is disconnected therefrom.

Finally, the contact surface of the end 48 of the holding ring 17 contacts the opposed face 31 of the housing. Upon further forcing of the rolling bearing in the bore ring 2, the holding ring 17 is forced through the part 10 to the mounting flange 8. At the end of this movement the spring ring 12 snaps into the annular groove 13 of the housing 1. At the same time the holding ring 17 reaches a position at which a narrow seal gap is formed between the end of the holding ring 17 away from the spring ring 12 and the adjacent sealing surface 21 of the mounting flange 8.

FIG. 8 illustrates a rolling bearing before its mounting in the bore of a housing. This rolling bearing has a holding ring 17 on the outer surface 11 of the bearing outer ring, the holding ring having a smooth cylindrical collar 8 as a seating surface. The collar section 18 has, on its free end, a contact surface end 50 in the form of a radially outward bent flange. The holding ring 17 further has, on the end away from the spring ring 12, a conically outwardly open bore section 51.

During the assembly of the holding ring 17, the holding ring is pushed with its collar section 18 on the outer surface 11 of the part 9. The conical bore section 51 of the holding ring then engages the spring ring 12 projecting from the surface 11 (as illustrated in dash dot lines in FIG. 8). The spring ring 12 is depressed into the annular gap 22 by the bore section 51 upon further shoving on of the holding ring. At the end of the assembly of the holding ring, the collar section 18 passes over the annular gap 22, so that the spring ring 12 is completely withdrawn into the annular gap 22. The rolling bearing form is thereby a self holding assembly, which can be mounted at a desired place in the bore of a housing without further handling.

FIG. 9 illustrates the bearing arrangement of FIG. 8 in the fixed condition. The face of the end 20 of the holding ring away from the spring ring 12 forms here a narrow sealing gap with the mounting flange 8 of the bearing inner ring. The spring ring 12 projects in part in the annular groove 13 of the housing and thereby holds the rolling bearing axially fixed in the bore 2 of the housing.

The above described embodiments for the mounting of a rolling bearing in a housing can be modified. It is thus not necessary that the rolling bodies be in the form of balls. In addition, the forms of the outer and inner bearing rings can be modified in a manner, for example, to employ tapered rollers. The bearing inner ring can in many cases be transversely separated, as is the disclosed bearing outer ring. The transversely separated parts of the bearing inner ring can then be affixed to an inner part which is coupled to the drive element of the wheel.

The annular gap in the bearing outer ring need not be formed between two loose parts of the bearing outer ring. It can for example also be formed in the outer surface of th outer ring by the side surface of a circulating groove. The bearing outer ring is then unitarily formed. Thereby, the rolling bearing can have one or more rows of rolling bearings.

What is claimed is:

1. In a rolling bearing arrangement including means for fastening a rolling bearing in a bore in a housing, the arrangement comprising a bearing inner ring, a bearing outer ring having an outer surface slidably positioned in said bore and abutting the bore, and rolling bodies arranged between the bearing inner ring and the bearing outer ring, a spring ring inserted in an annular gap between a pair of axially opposite end portions of the bearing outer ring, the spring ring being radially outwardly springable into an annular groove in the bore of the housing for axially holding the rolling bearing to the housing; the improvement comprising a holding ring axially displaceably mounted on the outer surface of the outer bearing ring, said holding ring having a collar section positioned to surround and concentrically hold said spring ring in one relative axial position of said holding ring and said spring ring, said collar section having a contact surface positioned to engage one axial end of said housing for axially displacing said holding ring with respect to said spring ring during assembly of said arrangement in a housing.

2. The arrangement of claim 1 wherein the spring ring of the rolling bearing is comprised of an annular section projecting radially outwardly beyond the outer surface of the bearing outer ring, said bore having a chamfered edge, said annular section arranged so that during the inserting of the rolling bearing in the bore of housing it laterally engages the chamfered edge of the bore for pressing the spring ring radially inwardly.

3. The arrangement according to claim 1, wherein a seal is formed as a base on the end of the holding ring away from the spring ring, whereby the seal is brought to an operating position at least after the mounting of the rolling bearing.

4. The arrangement of claim 1 wherein the holding ring has a conically outwardly opening bore section on the end thereof away from said spring ring.

5. The arrangement of claim 1, wherein the annular groove of the bore of the housing has a conically opening groove wall for the groove opening, the spring ring having a corresponding conical cross-section outer stopping surface, the groove walls being shaped to provide a form closing contact for receiving the radially outwardly extending stopping surface.

6. The arrangement according to claim 1 wherein the outer surface of the spring ring comprises a coat of a friction minimizing lubricant.

7. The arrangement according to claim 1 wherein said end portions of the bearing outer ring of the rolling bearing comprise separate rings and the gap of the bearing outer ring is formed by the side surfaces of the separate rings.

8. The arrangement according to claim 1 wherein the rolling bearing is a rolling bearing having inclined force action lines and said end portions comprising two laterally separated bearing outer rings in a O-arrangement the annular gap comprising a gap between the two outer bearing rings.

9. The arrangement according to claim 1 wherein at least two circumferentially distributed openings extend through the housing to the outer surface of the spring ring for receiving disassembly bolts positioned to force said spring ring radially inwardly.

10. The arrangement according to claim 1 wherein the side surface of the annular gap of the bearing outer ring comprises a coat of a friction minimizing lubricant.

11. In a rolling bearing arrangement including means for fastening a rolling bearing in a bore in a housing, the arrangement comprising a bearing inner ring, a bearing outer ring having an outer surface slidably positioned in said bore and abutting said bore, and rolling bodies arranged between the bearing inner ring and the bearing outer ring, a spring ring inserted in an annular gap between a pair of axially opposite end portions of the bearing outer ring, the spring ring being radially outwardly springable into an annular groove in the bore of the housing for axially holding the rolling bearing in the housing; the improvement comprising a holding ring slidably mounted on the outer circumferential surface of one end portion of said outer bearing ring, said holding ring being recessed on the axial end thereof towards the other said end portion of said outer bearing ring, said recessed end being shaped to releaseably engage and hold said spring ring radially outwardly thereof to inhibit removal of said spring ring from said annular groove at a first relative position of said spring ring and holding ring, said holding ring being axially slidable from said first position relative to said spring ring.

12. The arrangement of claim 11 wherein the opposite axial end of said holding ring extends axially of said one end portion of said bearing outer ring to define a seal with said inner ring at another relative axial position of said spring ring and holding ring.

* * * * *

UNITED STATES PATENT AND TRADEMARK OFFICE
CERTIFICATE OF CORRECTION

PATENT NO. : 4,647,230

DATED : March 3, 1987

INVENTOR(S) : Wolfgang Friedrich, et al.

It is certified that error appears in the above-identified patent and that said Letters Patent is hereby corrected as shown below:

Column 6, line 43, change "th" to --the--.

Column 8, line 30, change "groove" to --gap--.

Signed and Sealed this

Twenty-eighth Day of June, 1988

Attest:

DONALD J. QUIGG

Attesting Officer

Commissioner of Patents and Trademarks